(No Model.)

J. N. PARKER.
PRUNING SHEARS.

No. 369,205. Patented Aug. 30, 1887.

Witnesses:
David S. Williams
Hamilton D. Turner

Inventor:
Joseph N. Parker
by his Attorneys
Howson and Sons

United States Patent Office.

JOSEPH N. PARKER, OF VINELAND, NEW JERSEY.

PRUNING-SHEARS.

SPECIFICATION forming part of Letters Patent No. 369,205, dated August 30, 1887.

Application filed February 14, 1887. Serial No. 227,499. (No model.)

*To all whom it may concern:*

Be it known that I, JOSEPH N. PARKER, a citizen of the United States, and a resident of Vineland, Cumberland county, New Jersey, have invented certain Improvements in Pruning-Shears, of which the following is a specification.

My improvement consists in providing one of the blades of a pair of pruning or trimming shears with a hook so constructed that, besides performing the ordinary functions of a hook, it will serve as a guard to prevent interference with the proper action of the shear-blades, and will prevent said blades from being thrust into the ground when the shears are employed for trimming close to the roots of a bush or other plant.

Figure 1:
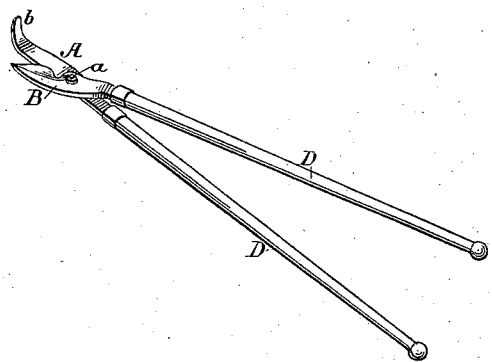
Figure 2:
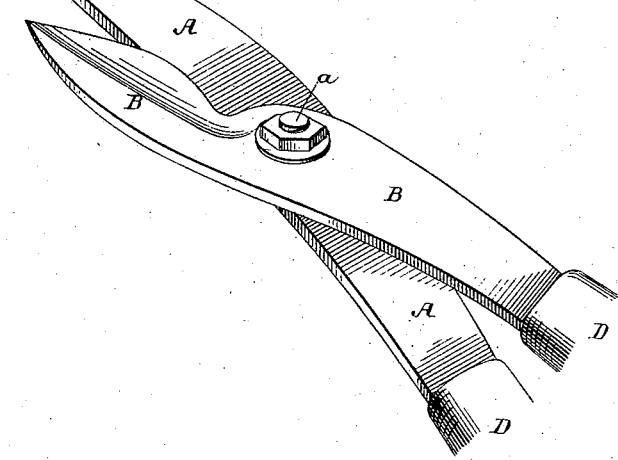
Figure 3:
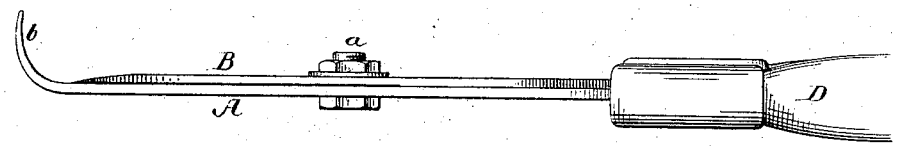

In the accompanying drawings, Figure 1 is a perspective view of a pair of trimming or pruning shears illustrating my invention; Fig. 2, a perspective view of the shear-blades on a larger scale, and Fig. 3 a side view of the shear-blades.

Vine, berry, and fruit growers, and gardeners generally, prefer the use of shears in trimming and pruning vines, bushes, trees, &c., because they can trim closer with shears than with a pruning hook or knife, although they cannot with the shears readily pry apart tangled masses of twigs, stems, or canes, and cannot, after the cutting operation, pull or throw the cuttings out of the way. My improved shears overcome these objections to the ordinary shears and possess certain other features of advantage, which are hereinafter fully set forth.

A and B are the two blades of the shears, which are pivoted together by means of a bolt, *a*, provided with suitable nuts and washers, or by means of a rivet, if preferred, both blades being provided with handles D, which should be of such length that the shears can be used for pruning or trimming twigs or branches at some distance from the ground, or when used for cutting close to the ground will not require the operator to stoop or assume an inconvenient position.

The blade A extends beyond the point of the blade B, and this projecting portion is bent upward almost at a right angle to the face of the blade A, so as to form a hook, *b*, which is available for prying apart tangled masses of twigs, canes, &c., so as to single out those which are to be cut, the hook also providing a ready means of pulling the cuttings out of the way as the operation proceeds, so as to prevent the accumulation of a tangled mass of cuttings to interfere with the pruning.

As the hook formed in accordance with my invention may be as broad as desired without reference to the thickness of the blade of the shears, it not only performs the ordinary functions of a hook, as before set forth, but also provides a shield or guard which may be used for holding back twigs or canes which would otherwise interfere with the action of the blades of the shears on the twigs or canes which it is desired to cut, the guard also preventing the blades from being thrust into the ground when the shears are used for trimming close to the roots of a bush or other plant.

Although I prefer to form the hook *b* by bending up the outer end of the blade A, said hook may, if desired, consist of a separate piece bolted, riveted, or otherwise secured to said blade.

I am aware that the blade of a pair of shears has been provided with a guard-plate having a pocket for receiving the point of the shear-blade; but this pocket does not project laterally beyond the blade, so to form a hook and guard, as in my improved shears. Hence

I claim as my invention and desire to secure by Letters Patent—

A pair of pruning or trimming shears one of the blades of which extends beyond the other and has a portion projecting laterally therefrom beyond the end of the short blade, so as to form both a clawing-hook and a guard, all substantially as specified.

In testimony whereof I have signed my name to this specification in the presence of two subscribing witnesses.

JOSEPH N. PARKER.

Witnesses:
WILLIAM D. CONNER,
HARRY SMITH.